(No Model.)

P. WALTER.
BAKE OVEN.

No. 514,525. Patented Feb. 13, 1894.

Witnesses
Jno. G. Hinkel
A. N. Dobson

Inventor
Peter Walter
By Foster Freeman
Attorneys

UNITED STATES PATENT OFFICE.

PETER WALTER, OF MOUNT VERNON, INDIANA.

BAKE-OVEN.

SPECIFICATION forming part of Letters Patent No. 514,525, dated February 13, 1894.

Application filed July 13, 1893. Serial No. 480,402. (No model.)

*To all whom it may concern:*

Be it known that I, PETER WALTER, a citizen of the United States, residing at Mount Vernon, in the county of Posey and State of Indiana, have invented certain new and useful Improvements in Bake-Ovens, of which the following is a specification.

My invention relates to bake ovens, and it has for its object to provide a simple, cheap and effective oven, which shall distribute the heat evenly and thoroughly and to the best advantage, and to these ends my invention consists in an oven embodying the features of construction and arrangement of parts substantially as hereinafter more particularly set forth.

Figure 1:
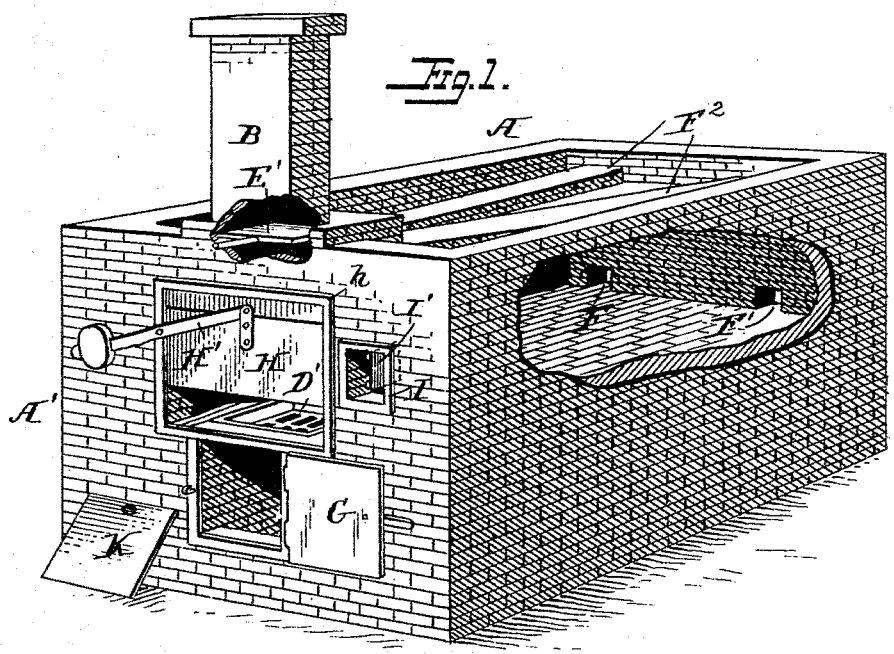
Figure 2:
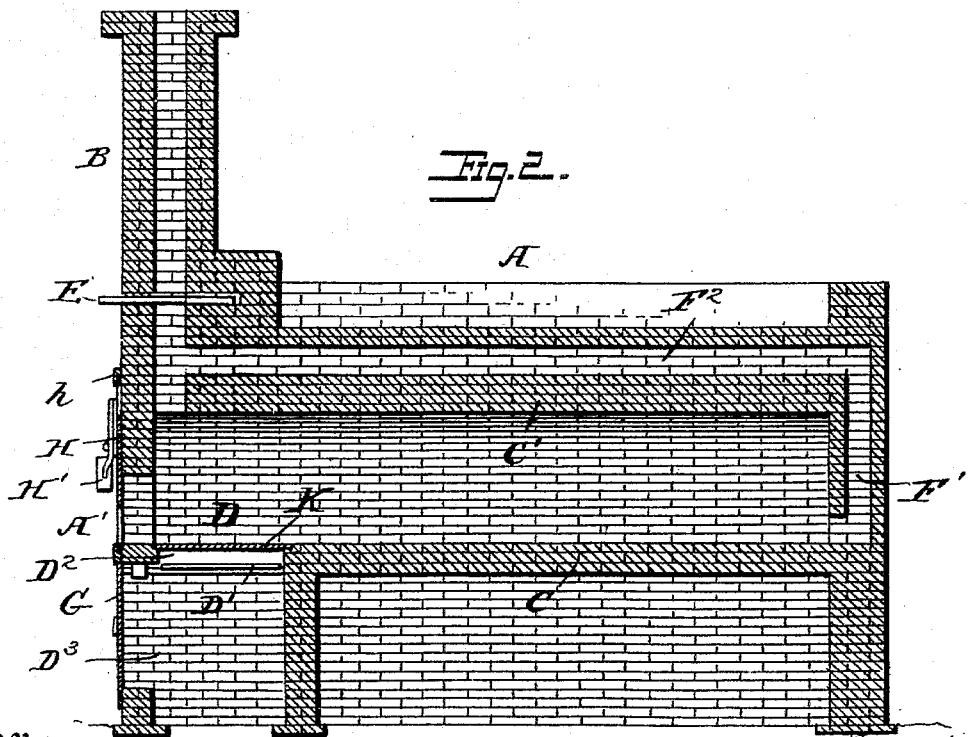

Referring to the accompanying drawings, Figure 1, is a perspective view, parts being broken away, showing an oven embodying my invention; and Fig. 2, is a longitudinal, vertical section of Fig. 1.

Heretofore many attempts have been made to provide a bake oven in which the heat shall be used to the best advantage, so as to cause the oven to bake evenly in all positions, and to utilize the heat to a greater or less advantage, and it is the object of my present invention to improve upon such structures, and to provide an oven which shall not only be simple and compact and easily made and set up, but which shall be so arranged that it can be readily heated and the heat thoroughly and properly distributed, so that the baking operation can be carried on with the greatest expedition and most satisfactory results, and I will now describe the embodiment of my invention illustrated in the accompanying drawings.

The structure or body A of the oven is preferably made of brick, and while its outline may vary, I prefer to make it rectangular, as shown in Fig. 1, as I have found this a most convenient structure, and the chimney B, is built on the forward end A' of the structure or body and preferably centrally arranged immediately over the fire-place. The oven proper is a rectangular structure, having a base C and a cover C', which is preferably arched slightly transversely, and which extends practically throughout the length of the structure.

Arranged in the forward portion of the oven, is the fire-place D, which is provided with a grate D', preferably tilting, this grate being shown as arranged below the bottom of the oven, so as to furnish a convenient receptacle $D^2$ for the fuel, and immediately over the ash-pit $D^3$.

The flues F, F', extend from the bottom of the rear portion of the oven upward to and connect with the horizontal flues $F^2$, extending over the top of the oven and connecting with the chimney B, below the damper E, and in the present instance I have shown two such flues, which are sufficient for an oven of a certain size, but more or less flues can be used, according to the requirements of any particular case. It will be observed that the base C of the oven extends straight back to the rear upright wall of the furnace or outer structure, and that the flues F, F' open up directly from such base. In other words, the extended portion of the base serves as the bottoms for the openings leading to the flues, without any obstructing portion or wall. In this way, a clean sweep or passage of the products of combustion is had, and by such a construction I economize greatly in the quantity of material employed, as well as avoiding complicated forms of flue openings.

The oven is provided with a door G, for the ash-pit, which can be opened for the removal of the ashes, and tightly closed when desired, and with a door H, for the oven proper, and this door is preferably in the form best indicated in Fig. 1, being arranged to slide in the frame *h*, and being provided with a weighted lever H', by means of which it can be readily raised and lowered and held in any desired position, when feeding or discharging the oven. Also arranged in the face of the structure, is a peep-hole I, which is provided with a suitable glass, and this glass is preferably hung in a swinging frame I', pivoted at the top, so that it can be swung aside for the purposes of inserting any instrument, as a thermometer, to take the temperature, or any other instrument, to manipulate the material being baked, without the necessity of opening the main door.

The fire-place D, is provided with a suitable cover K which is adapted to fit tightly over the fire-place, furnishing a level bottom for the convenient insertion and removal of the material being baked, and preventing any dust, dirt or ashes from reaching the oven.

The operation of the device will be readily understood, and it will be seen that when the oven is to be heated, a fire, either of coke, wood, or other material, is built on the dumping grate D', the draft and the products of combustion are forced to travel throughout the extent of the oven, and are delivered through the flues F, F', arranged at the lowermost portion of the rear end, thereby causing the most perfect and satisfactory distribution of the heat throughout the oven, so that all parts are practically uniformly heated. Thence the products of combustion pass upward through the flues F, F', into the horizontal flues F², over the top of the oven, and thence into the chimney, and it will be understood that the products of combustion are thereby used in the best and most economical manner to thoroughly and evenly heat the oven to a uniform temperature. When the oven is properly heated, the cover K is tightly fitted in place over the fire-place, the grate is dumped and the material inserted in the oven, to be baked, and it will be seen that by means of the doors, the oven can be practically closed and sealed, and the operation inspected through the peep-hole I. By fitting the cover K into place a little while before the fire is dumped, the said cover is made to acquire as nearly as possible the same degree of heat that the interior or base of the oven has already attained. In this way, the heating of the cover and oven-base is equalized to a great extent, and there will be no unequal baking between such articles as might be placed upon the plate, and those which may be rested upon the base of the oven. Moreover, whatever moisture is driven out of the material being baked, is retained in the oven, giving the article baked a nice color and fine crust. When it is desired to remove the baked material, the damper E can be opened so that there will be a tendency of the heat to pass directly up through the chimney, and less will be radiated out through the door in the face of the operator.

It will be seen that the whole structure is exceedingly simple, and I have found in actual practice that it is exceedingly effective and economical in the use of fuel.

What I claim is—

1. A bake oven, comprising the outer structure having a chimney at the front end, the oven proper formed therein, a fire-place in the front end provided with a tilting grate and a removable cover for the fire-place, and having flues extending from the lower portion of the rear end of the oven upward and over the top of the oven into the chimney, substantially as described.

2. A bake oven, comprising a rectangular structure, an oven proper embodied therein the oven being provided with a depressed fire-place having a tilting grate and a removable cover, a damper in front above the flues, flues at the lower rear portion of the oven, extending upward and horizontally over the oven into the chimney, a peep-hole having a hinged cover, and a sliding door for the oven provided with a counter-balancing handle, substantially as described.

In testimony whereof I have signed my name to this specification in the presence of two subscribing witnesses.

PETER WALTER.

Witnesses:
HENRY WALTER,
J. H. KLAUS.